April 15, 1924.                                              1,490,386
                          D. HANLON
                         FISHING TOOL
                   Original Filed April 3, 1922

Inventor
Dale Hanlon

By
        Attorney

Patented Apr. 15, 1924.

1,490,386

UNITED STATES PATENT OFFICE.

DALE HANLON, OF NEW BETHLEHEM, PENNSYLVANIA.

FISHING TOOL.

Application filed April 3, 1922, Serial No. 549,119. Renewed January 16, 1924.

*To all whom it may concern:*

Be it known that I, DALE HANLON, a citizen of the United States, residing at New Bethlehem, in the county of Clarion and State of Pennsylvania, have invented certain new and useful Improvements in Fishing Tools, of which the following is a specification.

This invention relates to a fishing-tool for recovering broken lines from oil and gas wells.

An important object of the invention is to provide an improved fishing tool which is attachable to the main drilling stem of the well-drill and which automatically clamps the broken line as the stem is elevated, means being provided to cushion the impact of the falling stem.

With these and other objects in view the invention resides generally in the combination and arrangement of parts here and after described.

Figure 1:
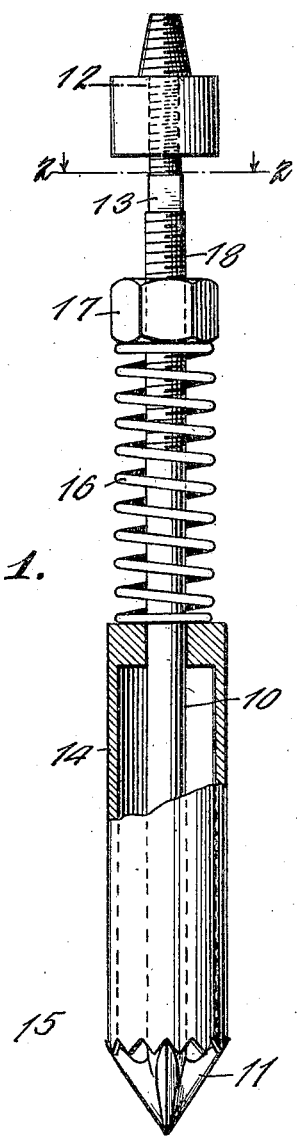
Figure 1 is a view partly in elevation and partly in section of the proposed fishing-tool.
Figure 2:
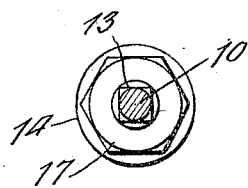
Figure 2 is a cross section thereof taken on line 2—2 of Figure 1.
Figure 3:
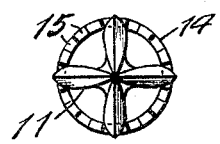
Figure 3 is a bottom end view thereof.

Describing the invention in detail 10 designates a solid rod having a four-pronged head or dart 11 at its lower end and a tapered screw pin 12 at its upper end. Pin 12 is for attaching the rod to the main stem of the drilling apparatus and below the pin a suitable wrench hold 13 is provided. This hold is to be engaged by the wrench used in connecting up the tool.

Slidably mounted on rod 10 is a cylinder 14 which has its lower end provided with a series of notches 15 as shown. The prong of the rod engages in these notches when the cylinder is in its lowermost position and, hence, provides suitable gripping jaws between which the broken line is adapted to be securely engaged. Encircling the rod with front end resting on top of cylinder 14, is a spirally coiled spring 16 which may be suitably tensioned by an adjusting nut 17. Nut 17 is adjustable along the threaded portion 18 of the rod and normally tensioned spring 16 so that the latter presses down against cylinder 14 and holds same engaged with prongs 11.

In using the fishing tool the same is lowered into the well casing after being attached to the main drilling stem and cylinder 14 shoves the broken line down as the drilling stem descends. As the line gathers into a solid or compact mass its resistance increases and hence cylinder 14 yields slightly as spring 16 gives, thereby permitting the pronged head 11 to project downwardly in advance of the notched end of the cylinder. Upon withdrawing the drilling stem and thereby removing weight of the same from spring 16, the latter is permitted to expand and to draw the prongs of the head against the notched end of cylinder 14 whereby the broken line is caught therebetween and hence raised upwardly with the fishing tool as the latter is withdrawn from the casing.

From the foregoing it is believed that the advantages and novel features of the invention can be readily understood and that further detailed description is unnecessary.

What is claimed is:

1. A fishing tool comprising a rod having means for attachment to the stem of a drilling apparatus, a pronged head at one end of the said rod, and a longitudinally adjustable member slidable on the said rod and normally engaging the said pronged head to provide clamp means.

2. A fishing tool comprising a rod, barbs or prongs at one end of the rod to provide gripping members therefor, a cylinder slidable on the said rod and having its lower edge notched to receive the said barbs or prongs, and tensionable means resiliently holding the cylinder engaged with the said barbs or prongs.

3. A fishing tool comprising a rod, having means at one end for attachment to the main stem of a drill and a pronged or barbed head at the opposite end, a cylinder slidable on the said rod having its lower edge notched to receive the prongs of the said rod, an adjusting nut movable along the said rod, and a tensioning spring between the nut and the cylinder.

In testimony whereof I affix my signature.

DALE HANLON.